United States Patent
Fujita et al.

(10) Patent No.: US 11,051,530 B2
(45) Date of Patent: Jul. 6, 2021

(54) CHOCOLATE-LIKE FOOD CONTAINING HIGHLY UNSATURATED FATTY ACID

(71) Applicant: FUJI OIL HOLDINGS INC., Osaka (JP)

(72) Inventors: Tomoko Fujita, Ibaraki (JP); Masaharu Kato, Osaka (JP); Miwako Morikawa, Osaka (JP); Makiko Kojima, Ibaraki (JP)

(73) Assignee: FUJI OIL HOLDINGS INC., Osaka (JP)

( * ) Notice: Subject to any disclaimer, the term of this patent is extended or adjusted under 35 U.S.C. 154(b) by 144 days.

(21) Appl. No.: 16/304,693

(22) PCT Filed: May 9, 2017

(86) PCT No.: PCT/JP2017/017458
§ 371 (c)(1),
(2) Date: Nov. 27, 2018

(87) PCT Pub. No.: WO2017/208741
PCT Pub. Date: Dec. 7, 2017

(65) Prior Publication Data
US 2020/0178555 A1 Jun. 11, 2020

(30) Foreign Application Priority Data
Jun. 2, 2016 (JP) .............................. JP2016-111223

(51) Int. Cl.
*A23G 1/36* (2006.01)
*A23D 9/00* (2006.01)
*A23G 1/30* (2006.01)

(52) U.S. Cl.
CPC .................. *A23G 1/36* (2013.01); *A23D 9/00* (2013.01); *A23G 1/30* (2013.01); *A23V 2002/00* (2013.01)

(58) Field of Classification Search
CPC ........ A23G 1/36; A23G 1/30; A23V 2002/00; A23D 9/00
USPC .......................... 426/541, 601, 602, 631, 660
See application file for complete search history.

(56) References Cited

FOREIGN PATENT DOCUMENTS

| EP | 1637134 | 3/2006 |
|---|---|---|
| GB | 2214051 | 8/1989 |
| JP | S5917949 | 1/1984 |
| JP | H05292885 | 11/1993 |
| JP | H0686637 | 3/1994 |
| JP | 2004041010 | 2/2004 |
| JP | 2009278938 | 12/2009 |
| KR | 20050007718 | 1/2005 |
| RU | 2333660 | 9/2008 |
| RU | 2524097 | 7/2014 |
| WO | 9719601 | 6/1997 |

OTHER PUBLICATIONS

Aharonia, G., Cacao—the acid test!, Kennedy's Confection Nov. 2016, kennedysconfection.com.*
JPH05292885A, google translation, Nov. 1993.*
"Search Report of Europe Counterpart Application", dated Jan. 2, 2020, p. 1-p. 19.
"International Search Report (Form PCT/ISA/210)" of PCT/JP2017/017458, dated Aug. 8, 2017, with English translation thereof, pp. 1-3.
Office Action of Russia Counterpart Application, with English translation thereof, dated Jul. 10, 2020, pp. 1-12.
Stephen T. Beckett, "The Science of Chocolate", Korin Books, published Jun. 30, 2007, pp. 45-46.

* cited by examiner

*Primary Examiner* — Leslie A Wong
(74) *Attorney, Agent, or Firm* — JCIPRNET

(57) ABSTRACT

The present invention relates to a chocolate-like food containing a highly unsaturated fatty acid-containing fat or oil, and the objective of the present invention is to provide such a chocolate-like food that is suppressed in change in the flavor over time. The present invention is able to suppress change in the flavor over time of a chocolate-like food containing a highly unsaturated fatty acid-containing fat or oil by adjusting the pH thereof to a value within a predetermined range. It is preferable to use a highly unsaturated fatty acid-containing fat or oil which has been subjected to antioxidation treatment. It is preferable that the antioxidation treatment is carried out by dispersing water phases, in each of which a predetermined amount of a water-soluble antioxidant is dissolved, in the highly unsaturated fatty acid-containing fat or oil such that the water phases have particle diameters of 300 nm or less.

13 Claims, No Drawings

CHOCOLATE-LIKE FOOD CONTAINING HIGHLY UNSATURATED FATTY ACID

CROSS-REFERENCE TO RELATED APPLICATION

This application is a 371 application of International PCT application serial no. PCT/JP2017/017458, filed on May 9, 2017, which claims the priority benefit of Japan application no. 2016-111223, filed on Jun. 2, 2016. The entirety of each of the abovementioned patent applications is hereby incorporated by reference herein and made a part of this specification.

TECHNICAL FIELD

The present invention relates to a chocolate-like food which contains highly unsaturated fatty acid-containing oils and fats.

BACKGROUND ART

A chocolate-like food typified by chocolate is a food which is preferred by children. Therefore, by blending specific nutritional components into a chocolate-like food, the nutritional components can be taken by children without difficulty.

Highly unsaturated fatty acids represented by DHA and EPA are materials of which the physiological effects thereof have been focused on. However, highly unsaturated fatty acids are likely to oxidize and deteriorate and difficult to blend into general foods in many cases.

In Patent Literature 1, "a chocolate composition containing at least one of hydrogenated untreated oils and fats including eicosapentaenoic acid and/or docosahexaenoic acid, and catechin" is described.

In Patent Literature 2, "a highly unsaturated fatty acid-containing food in which oils and fats containing highly unsaturated fatty acids are coated with an edible film-forming substance including proteins or salts thereof, lipids, or a combination thereof such that they are substantially blocked from outside air, and which contains particulate coated oils and fats having a diameter of 2 mm or less" is described.

An alkali treatment may be performed when cocoa powder is produced. It has been described that this is performed in order to increase the dispersibility of cocoa powder in water (Patent Literature 3). On the other hand, there is description that cocoa powder for chocolate is not often subjected to an alkali treatment (Non-Patent Literature 1).

CITATION LIST

Patent Literature

[Patent Literature 1] Japanese Unexamined Patent Application Publication No. H5-292885
[Patent Literature 2] Japanese Unexamined Patent Application Publication No. S59-17949
[Patent Literature 3] Japanese Unexamined Patent Application Publication No. 2009-278938

Non-Patent Literature

[Non-Patent Literature 1] "The Science of Chocolate" P50 translated by Tetsuo KOYANO, Korin Books, published Jun. 30, 2007

SUMMARY OF INVENTION

Technical Problem

The present invention relates to a chocolate-like food containing highly unsaturated fatty acid-containing oils and fats, and an objective of the present invention is to provide such a chocolate-like food in which change in flavor over time is reduced.

Solution to Problem

The inventors conducted extensive studies in order to solve these problems.

In the method described in Patent Literature 1, it is thought that an effect of reducing change over time to a certain degree is observed, but a stronger effect is required because a best-before period of a chocolate-like food is relatively long.

In the method described in Patent Literature 2, since highly unsaturated fatty acids in a capsule form are added, application is difficult in foods for which mouthfeel properties are important as in chocolate-like foods.

In Patent Literature 3 and Non-Patent Literature 1, although an alkali treatment on cocoa is described, there is no suggestion of an effect of the treatment on a chocolate-like food containing highly unsaturated fatty acid-containing oils and fats.

The inventors conducted further studies. As a result, it was found that, when a pH of chocolate is controlled, in a chocolate-like food containing highly unsaturated fatty acid-containing oils and fats, it is possible to reduce change in flavor over time, and the present invention was thus realized.

That is, the present invention is as follows.

(1) A chocolate-like food including a highly unsaturated fatty acid-containing oil and fat composition having a total of 0.02 to 5 weight % of EPA and DHA and in which a pH is adjusted to 5.8 to 8.

(2) The chocolate-like food according to (1),
wherein the highly unsaturated fatty acid-containing oil and fat composition includes 1 to 10 weight % of an aqueous phase containing a total of 3 to 65 weight % of a water-soluble antioxidant dispersed in a particle size of 300 nm or less in an oil phase.

(3) The chocolate-like food according to (1),
wherein the highly unsaturated fatty acid-containing oil and fat composition includes an antioxidant oil and fat composition in which 1 to 10 weight % of an aqueous phase containing a total of 3 to 65 weight % of a water-soluble antioxidant at 3 to 65 weight % is dispersed in a particle size of 300 nm or less in an oil phase in highly unsaturated fatty acid-containing oils and fats.

(4) The chocolate-like food according to (2),
wherein at least one oil-soluble emulsifier selected from polyglycerol esters, sugar esters, sorbitan esters, monoglycerin fatty acid esters, and lecithin is contained in the oil phase.

(5) The chocolate-like food according to (3),
wherein at least one oil-soluble emulsifier selected from polyglycerol esters, sugar esters, sorbitan esters, monoglycerin fatty acid esters, and lecithin is contained in the oil phase.

(6) A method of producing a chocolate-like food comprising:
dispersing 1 to 10 weight % of an aqueous phase containing a total of 3 to 65 weight % of a water-soluble antioxidant in an oil phase in a particle size of 300 nm or less to obtain a highly unsaturated fatty acid-containing oil and fat composition having a total of 0.02 to 5 weight % of EPA and DHA, and adjusting a pH to 5.8 to 8.
(7) The method of producing a chocolate-like food according to (6),
wherein the pH is adjusted using alkali treated-cocoa and/or cacao mass.
(8) The method of producing a chocolate-like food according to (6),
wherein an antioxidant oil and fat composition in which 1 to 10 weight % of the aqueous phase containing a total of 3 to 65 weight % of the water-soluble antioxidant is dispersed in the particle size of 300 nm or less in the oil phase in highly unsaturated fatty acid-containing oils and fats to obtain the highly unsaturated fatty acid-containing oil and fat composition having a total of 0.02 to 5 weight % of EPA and DHA, and the pH is adjusted to 5.8 to 8.
(9) The method of producing a chocolate-like food according to (7),
wherein an antioxidant oil and fat composition in which 1 to 10 weight % of the aqueous phase containing a total of 3 to 65 weight % of the water-soluble antioxidant is dispersed in the particle size of 300 nm or less in the oil phase in highly unsaturated fatty acid-containing oils and fats to obtain the highly unsaturated fatty acid-containing oil and fat composition having a total of 0.02 to 5 weight % of EPA and DHA, and the pH is adjusted to 5.8 to 8.
(10) The method of producing a chocolate-like food according to (6),
wherein at least one oil-soluble emulsifier selected from polyglycerol esters, sugar esters, sorbitan esters, monoglycerin fatty acid esters, and lecithin is contained in the oil phase.
(11) The method of producing a chocolate-like food according to (7),
wherein at least one oil-soluble emulsifier selected from polyglycerol esters, sugar esters, sorbitan esters, monoglycerin fatty acid esters, and lecithin is contained in the oil phase.
(12) The method of producing a chocolate-like food according to (8),
wherein at least one oil-soluble emulsifier selected from polyglycerol esters, sugar esters, sorbitan esters, monoglycerin fatty acid esters, and lecithin is contained in the oil phase.
(13) The method of producing a chocolate-like food according to (9),
wherein at least one oil-soluble emulsifier selected from polyglycerol esters, sugar esters, sorbitan esters, monoglycerin fatty acid esters, and lecithin is contained in the oil phase.
(14) A method of reducing off-flavors in a chocolate-like food, wherein a highly unsaturated fatty acid-containing oil and fat composition is prepared so that there is a total of 0.02 to 5 weight % of EPA and DHA, and in which a pH is adjusted to 5.8 to 8.
In other words, the present invention is as follows.
(21) A chocolate-like food including a highly unsaturated fatty acid-containing oil and fat composition so that there is a total of 0.02 to 5 weight % of EPA and DHA, and in which a pH is adjusted to 5.8 to 8.
(22) The chocolate-like food according to (21),
wherein the highly unsaturated fatty acid-containing oil and fat composition includes 1 to 10 weight % of an aqueous phase containing a total of 3 to 65 weight % of a water-soluble antioxidant dispersed in a particle size of 300 nm or less in an oil phase.
(23) A method of producing the chocolate-like food according to (21) or (22) including dispersing 1 to 10 weight % of an aqueous phase containing a total of 3 to 65 weight % of a water-soluble antioxidant in an oil phase in a particle size of 300 nm or less to obtain a highly unsaturated fatty acid-containing oil and fat composition having a total of 0.02 to 5 weight % of EPA and DHA, and adjusting a pH to 5.8 to 8.
(24) The method of producing the chocolate-like food according to (23),
wherein the pH is adjusted using alkali treated-cocoa and/or cacao mass.

Advantageous Effects of Invention

According to the present invention, in a chocolate-like food containing highly unsaturated fatty acid-containing oils and fats, it is possible to reduce change in flavor over time.

DESCRIPTION OF EMBODIMENTS

A chocolate-like food referred to in the present invention is, for example, chocolate. In addition, chocolates referred to herein include not only chocolate, semi-chocolate, and chocolate-based foods defined by the National Chocolate Industry Fair Trade Association, and the Chocolate-Based Food Industry Fair Trade Association, but also foods in which oils and fats are contained as essential components and supplementary raw materials such as sugars, milk powder, cocoa raw materials (cacao mass, cocoa, and cocoa butter), fruit juice powder, fruit powder, flavorings, emulsifiers, a fragrance material, and coloring agents are incorporated in certain proportions as necessary.

Examples of typical chocolates include sweet chocolate, milk chocolate, and white chocolate. In addition, strawberry chocolate obtained by adding a fruit component to typical chocolate may be exemplified.

Highly unsaturated fatty acid-containing oils and fats referred to in the present invention are oils and fats containing at least one highly unsaturated fatty acid as constituent fatty acids. Here, a highly unsaturated fatty acid is also called a polyunsaturated fatty acid, and is a generic name for fatty acids containing many double bonds. Specifically, DHA (docosahexaenoic acid) and EPA (eicosapentaenoic acid) may be exemplified.

It is necessary for the chocolate-like food according to the present invention to contain highly unsaturated fatty acid-containing oils and fats so that a total amount of DHA and EPA is 0.02 to 5 weight %, and this amount is preferably 0.02 to 4 weight %, and more preferably 0.05 to 3 weight %. When an appropriate amount of highly unsaturated fatty acid-containing oils and fats is contained, effects thereof can be expected. Here, an oil containing such highly unsaturated fatty acid-containing oils and fats may be simply referred to as "PUFA oil."

In the present invention, a highly unsaturated fatty acid-containing oil and fat composition subjected to an antioxidation treatment is preferably used for the highly unsaturated fatty acid-containing oils and fats. Details will be described below.

In the chocolate-like food according to the present invention, it is necessary for the pH to be adjusted to 5.8 to 8. The pH is preferably 5.9 to 7.8 and more preferably 6.0 to 7.5. When the pH is appropriate, even if highly unsaturated fatty acid-containing oils and fats are included, it is possible to reduce deterioration of flavor.

Here, a pH of a chocolate-like food is measured after the chocolate-like food is dispersed in an appropriate amount of water. In addition, adjustment of a pH of a chocolate-like food is preferably performed by appropriately blending in alkali treated-cocoa and performing adjustment.

Here, a pH of a chocolate-like food is measured by the following method.
1. A chocolate-like food is diluted 10-fold in deionized water at 45° C.
2. The chocolate-like food is dispersed to the extent that there are no aggregations of 1 mm or more.
3. Centrifugation (4,000 rpm, 30 min) is performed and the supernatant is separated off.
4. The pH of the supernatant at 20° C. is measured.

A method of producing a chocolate-like food according to the present invention will be described below.

"Alkali Treatment on Cocoa"

An alkali treatment on cocoa is widely performed in order to improve the dispersibility thereof and the like. In the present invention, cocoa can be treated according to this method. Specifically, an alkaline solution is brought into contact (sprayed, etc.) with cacao beans, cacao nibs, or the like and roasting and degreasing are performed. The order of the alkaline solution spraying, roasting, and degreasing is not particularly limited.

Here, in the present invention, commercially available alkali-treated cocoa can be used. When a commercial product is used, it is possible to easily prepare the chocolate-like food according to the present invention.

"Alkali Treatment on Cacao Mass"

An alkali treatment on cacao mass is widely performed in order to improve flavor and the like. In the present invention, cacao mass can be treated according to this method. Specifically, an alkaline solution is brought into contact (sprayed, etc.) with cacao beans, cacao nibs, or the like, and roasting and atomization are performed. The order of the alkali solution spraying and roasting is not particularly limited.

"Antioxidation Treatment on Highly Unsaturated Fatty Acid-Containing Oils and Fats"

An antioxidation treatment on highly unsaturated fatty acid-containing oils and fats according to the present invention is performed by dispersing an aqueous phase in which a water-soluble antioxidant is dissolved so that the particle size is 300 nm or less. Here, the aqueous phase indicates that a water-soluble component in this treatment is dissolved in water.

As the water-soluble antioxidant, various materials can be used. Specifically, vitamin C, and catechin may be used, and some amino acids, for example, proline, glycine, and serine, exhibit antioxidant power for this purpose, and can be used as a water-soluble antioxidant.

The water-soluble antioxidant in an aqueous phase needs to be contained at 3 to 65 weight % in the aqueous phase, more preferably, 10 to 63 weight %, and most preferably 16 to 60 weight %. When an appropriate amount of an appropriate water-soluble antioxidant is used, strong antioxidant power can be exhibited.

Here, in the present invention, the water-soluble antioxidant needs to be substantially dissolved in the aqueous phase. Here, in order to determine whether the water-soluble antioxidant is substantially dissolved, 5 ml of the aqueous phase is put into a 20 ml centrifuge tube at 20° C., and centrifugation is performed at 3,000 G for 1 minute. According to this treatment, a state in which no precipitates are visually observed is determined as a substantially dissolved state.

Here, when precipitates are formed in the aqueous phase, even if the aqueous phase is mixed with an oil phase and emulsified thereafter, the particle size may not reach a predetermined value. In this case, it is not possible to obtain an oil and fat composition having high antioxidant power.

The oil phase in the present invention indicates that an oil-soluble component is dissolved in oils and fats in the antioxidation treatment on highly unsaturated fatty acid-containing oils and fats. Specifically, the oil phase refers to highly unsaturated fatty acid-containing oils and fats, and also liquid oils and fats for adjusting a concentration and an oil-soluble emulsifier as necessary.

Here, the oil-soluble emulsifier refers to an emulsifier having an HLB of 7 or less in the present invention. Specifically, at least one selected from among polyglycerol esters, sugar esters, sorbitan esters, monoglycerin fatty acid esters, and lecithin is preferable. Polyglycerol ester, sugar ester, distilled monoglycerides, and lecithin are more preferable. Polyglycerol ester is particularly referable. Among them, polyglycerol condensed ricinoleic acid ester is most preferable. Here, polyglycerol condensed ricinoleate may be abbreviated as PGPR.

In the present invention, the aqueous phase is dispersed in the oil phase so that the particle size is 300 nm or less. Various emulsifying machines can be used for this. Specifically, a high pressure homogenizer, an ultrasonic emulsifying machine, or a 2-liquid collision type emulsifying device which is called a wet type jet mill can be used. A predetermined oil and fat composition can be obtained using an appropriate emulsifying device. Here, general emulsification conditions when a high pressure homogenizer is used are 30 to 40 MPa, and 10 to 30 passes.

The particle size is measured by the following method.
Device name: Zetasizer Nano S, manufacturer: Malvern
10 μl of a sample to be measured is diluted in 2 ml of hexane and measurement is performed.
(In measurement one day after the sample is prepared, in the case of 300 nm or more (that is, when precipitates are formed), a fail is determined)
Temperature: 20.0° C.
Equilibration time: 240 seconds
Cell: glass cell
Measurement angle: 173°
Positioning method: optimum position select
Selection of automatic damping: selected In addition, when no precipitates are visually observed, the particle size can be determined as 300 nm or less.

For an antioxidation treatment on highly unsaturated fatty acid-containing oils and fats, in order to achieve the objective, the above aqueous phase is first dispersed in general oils and fats such as soybean oil and rapeseed oil at a predetermined particle size to prepare an "oil and fat composition," and the oil and fat composition is then dispersed in highly unsaturated fatty acid-containing oils and fats.

A method of producing a chocolate-like food containing the highly unsaturated fatty acid-containing oils and fats according to the present invention will be described below.

In the present invention, basically, preparation can be performed according to a general chocolate preparation method. That is, in addition to cacao butter and sugar, raw materials such as cacao mass and milk powder are mixed in as necessary. Here, for sweet chocolate-like foods and milk chocolate-like foods, alkali-treated cocoa is appropriately added and a pH is adjusted. While an addition amount varies depending on cocoa alkali treatment conditions, if generally 1.5 to 10 weight % with respect to all components is added, a pH can be adjusted to a desired value.

Here, in the case of white chocolate in which no cocoa component is used, a pH can be adjusted by directly adding an alkaline agent.

The mixed raw materials are micronized using rollers and the like according to a conventional method and additionally subjected to refining. At the final step of this refining process, the highly unsaturated fatty acid-containing oils and fats are appropriately added.

Then, tempering is performed and filling and cooling are performed.

Examples will be described below.

EXAMPLES

Study 1

During blending, parts of "antioxidation-treated PUFA oil" were prepared based on formulations according to "○ Method of preparing antioxidation-treated PUFA oil."

Using the obtained "antioxidation-treated PUFA oils," according to formulations shown in the "chocolate part" in Table 1, chocolate-like foods were prepared according to "○ Method of preparing a chocolate-like food." The obtained chocolate-like foods were evaluated according to "○ Sensory evaluation method of chocolate-like foods."

The results are shown in Table 2.

In Table 1, the results obtained by checking the particle size one day after the preparation in the PUFA oils subjected to an antioxidation treatment are also shown.

Here, a dissolved state of the aqueous phase when the PUFA oil subjected to an antioxidation treatment was prepared was checked, and all were dissolved.

TABLE 1

| | | | Comparative Example 1 | Comparative Example 2 | Comparative Example 3 | Comparative Example 4 | Comparative Example 5 | Example 1 |
|---|---|---|---|---|---|---|---|---|
| Chocolate part | Cacao mass (Ghanaian) | | 39.6 | 39.6 | 39.6 | 39.6 | 39.6 | 39.6 |
| | Sugar | | 45.4 | 45.4 | 45.4 | 45.4 | 45.4 | 45.4 |
| | Cocoa butter | | 11.6 | 11.6 | 11.6 | 11.6 | 11.6 | 11.6 |
| | Whole milk powder | | — | — | — | — | — | — |
| | Lecithin | | 0.5 | 0.5 | 0.5 | 0.5 | 0.5 | 0.5 |
| | Fragrance material | | Appropriate amount | Appropriate amount | Appropriate amount | Appropriate amount | Appropriate amount | Appropriate amount |
| Antioxidation-treated PUFA oil | Aqueous phase | Vitamin C | 0.015 | 0.015 | 0.015 | 0.010 | 0.020 | 0.010 |
| | | Catechin | 0.045 | 0.045 | 0.045 | 0.005 | 0.010 | 0.005 |
| | | Water | 0.080 | 0.080 | 0.080 | 0.080 | 0.080 | 0.080 |
| | Oil phase | Soybean oil | 0.740 | 0.740 | 0.740 | 0.785 | 0.770 | 0.785 |
| | | Emulsifier | 0.120 | 0.120 | 0.120 | 0.120 | 0.120 | 0.120 |
| | | PUFA oil | 2.000 | 2.000 | 2.000 | 2.000 | 2.000 | 2.000 |
| Sum | | | 100.000 | 100.000 | 100.000 | 100.000 | 100.000 | 100.000 |
| pH | | | 5.49 | 5.66 | 5.62 | 5.66 | 5.66 | 5.91 |
| Total amount of EPA and DHA | | | 1.128% | 1.128% | 1.128% | 1.128% | 1.128% | 1.128% |
| Amount of water-soluble antioxidant in aqueous phase (weight %) | | | 42.9% | 42.9% | 42.9% | 15.8% | 27.3% | 15.8% |
| Aqueous phase particle size (nm) | | | 300 or less | 300 or less | 300 or less | 300 or less | 300 or less | 300 or less |

| | | | Example 2 | Example 3 | Example 4 | Example 5 |
|---|---|---|---|---|---|---|
| Chocolate part | Cacao mass (Ghanaian) | | 39.6 | 19.8 | 19.8 | 19.8 |
| | Sugar | | 45.4 | 439 | 43.9 | 43.9 |
| | Cocoa butter | | 11.6 | 19.3 | 19.3 | 19.3 |
| | Whole milk powder | | — | 13.5 | 13.5 | 13.5 |
| | Lecithin | | 0.5 | 0.5 | 0.5 | 0.5 |
| | Fragrance material | | Appropriate amount | Appropriate amount | Appropriate amount | Appropriate amount |

TABLE 1-continued

| | | | Formulations | | | |
|---|---|---|---|---|---|---|
| Antioxidation-treated PUFA oil | Aqueous phase | Vitamin C | 0.020 | 0.015 | 0.015 | 0.015 |
| | | Catechin | 0.010 | 0.045 | 0.045 | 0.045 |
| | | Water | 0.080 | 0.080 | 0.080 | 0.080 |
| | Oil phase | Soybean oil | 0.770 | 0.740 | 0.740 | 0.740 |
| | | Emulsifier | 0.120 | 0.120 | 0.120 | 0.120 |
| | | PUFA oil | 2.000 | 2.000 | 2.000 | 2.000 |
| Sum | | | 100.000 | 100.000 | 100.000 | 100.000 |
| pH | | | 5.91 | 6.01 | 6.11 | 6.08 |
| Total amount of EPA and DHA | | | 1.128% | 1.128% | 1.128% | 1.128% |
| Amount of water-soluble antioxidant in aqueous phase (weight %) | | | 27.3% | 42.9% | 42.9% | 42.9% |
| Aqueous phase particle size (nm) | | | 300 or less | 300 or less | 300 or less | 300 or less |

| | | | Example 6 | Example 7 | Example 8 | Example 9 | Example 10 | Example 11 | Example 12 | Example 13 | Example 14 |
|---|---|---|---|---|---|---|---|---|---|---|---|
| Chocolate part | Cacao mass (Ghanaian) | | 19.8 | — | 39.6 | 39.6 | 19.8 | 19.8 | 19.8 | 19.8 | 19.8 |
| | Sugar | | 43.9 | 42.5 | 45.4 | 45.4 | 43.9 | 43.9 | 43.9 | 43.9 | 43.9 |
| | Cocoa butter | | 19.3 | 27.0 | 11.6 | 11.6 | 19.3 | 19.3 | 19.3 | 19.3 | 19.3 |
| | Whole milk powder | | 13.5 | 27.0 | — | — | 13.5 | 13.5 | 13.5 | 13.5 | 13.5 |
| | Lecithin | | 0.5 | 0.5 | 0.5 | 0.5 | 0.5 | 0.5 | 0.5 | 0.5 | 0.5 |
| | Fragrance material | | Appropriate amount | Appropriate amount | Appropriate amount | Appropriate amount | Appropriate amount | Appropriate amount | Appropriate amount | Appropriate amount | Appropriate amount |
| Antioxidation-treated PUFA oil | Aqueous phase | Vitamin C | 0.015 | 0.015 | 0.015 | 0.020 | 0.015 | 0.015 | 0.015 | 0.015 | 0.015 |
| | | Catechin | 0.045 | 0.045 | 0.045 | 0.010 | 0.045 | 0.045 | 0.045 | 0.045 | 0.045 |
| | | Water | 0.080 | 0.080 | 0.080 | 0.080 | 0.080 | 0.080 | 0.080 | 0.080 | 0.080 |
| | Oil | Soybean | 0.740 | 0.740 | 0.740 | 0.770 | 1.240 | 1.740 | 2.240 | 2.440 | 2.540 |
| | | Emulsifier | 0.120 | 0.120 | 0.120 | 0.120 | 0.120 | 0.120 | 0.120 | 0.120 | 0.120 |
| | | PUFA oil | 2.000 | 2.000 | 2.000 | 2.000 | 1.500 | 1.000 | 0.500 | 0.300 | 0.200 |
| Sum | | | 100.000 | 100.000 | 100.000 | 100.000 | 100.000 | 100.000 | 100.000 | 100.000 | 100.000 |
| pH | | | 6.24 | 6.52 | 6.07 | 6.07 | 6.24 | 6.24 | 6.24 | 6.24 | 6.24 |
| Total amount of EPA and DHA | | | 1.128% | 1.128% | 1.128% | 1.128% | 0.846% | 0.564% | 0.282% | 0.169% | 0.113% |
| Amount of water-soluble antioxidant in aqueous phase (weight %) | | | 42.9% | 42.9% | 42.9% | 27.3% | 42.9% | 42.9% | 42.9% | 42.9% | 42.9% |
| Aqueous phase particle size (nm) | | | 300 or less | 300 or less | 300 or less | 300 or less | 300 or less | 300 or less | 300 or less | 300 or less | 300 or less |

(Units in formulation are weight %)

For cacao mass, those prepared from Ghanaian cocoa beans was used.

For cocoa butter, "cocoa butter 201" (commercially available from Fuji Oil Holdings Inc.) was used.

For catechin, "Sunphenon 90S" (commercially available from Taiyo Kagaku Co. Ltd.) was used.

For the emulsifier, "CRS-75" (polyglycerol condensed ricinoleic acid ester: PGPR, commercially available from Sakamoto Yakuhin kogyo Co., Ltd.) was used.

For PUFA oil, oils and fats containing 56.4% of EPA and DHA in total were used.

Although not described in the formulations, a pH was adjusted using alkali-treated cocoa. A blending amount was roughly 1 to 10 weight %, and this portion was offset with cacao mass.

For alkali treated cocoa, "cocoa powder 780-11" (commercially available from Barry Callebaut) was used.

○ Method of Preparing Antioxidation-Treated PUFA Oil

1. In the formulations, among materials classified as "antioxidation-treated PUFA oil," raw materials classified as an aqueous phase were mixed in, and dissolved to prepare an aqueous phase.
2. Similarly, raw materials classified as an oil phase were mixed in and dissolved to prepare an aqueous phase.
3. The aqueous phase was added to the oil phase, and the mixture was mixed using a HOMO MIXER to prepare an emulsion solution.
4. In addition, the solution was emulsified suing a high pressure homogenizer (37 MPa, 20 passes) to prepare antioxidation-treated PUFA oil.

○ Method of Preparing a Chocolate-Like Food

1. In the formulations, raw materials classified as "chocolate part" were mixed. Here, alkali treated cocoa was added to reach a predetermined pH, and an amount thereof was offset with cacao mass.
2. The mixed raw materials were micronized by a 5-step roller.
3. Conching was performed at 60° C. for 2 hours. 10 minutes before the end, separately prepared antioxidation-treated PUFA oil was added thereto.
4. Tempering was performed at 30° C.
5. Filling into a mold and cooling were performed.

○ Sensory Evaluation Method of Chocolate-Like Foods

The prepared chocolate-like food was stored at 20° C. and sensory evaluation was performed in a timely manner.

The sensory evaluation was performed with 5 panelists after samples were left at room temperature for 1 hour. The results were scored according to the reference based on the following criteria.

3 points or more was determined to be satisfactory each time. In addition, 3 points or more at D+21 days was determined to be finally satisfactory.

5 points: The sample was determined to be the same as commercially available chocolate.
4 points: The sample was slightly inferior to commercially available chocolate, but was determined to be almost the same.
3 points: Though the sample was slightly inferior to commercially available chocolate, and could not be said to be almost the same, it was determined to be within an allowance range.
2 points: The sample was clearly inferior to commercially available chocolate, and was not determined to be within an allowance range.
1 point: The sample was extremely inferior to commercially available chocolate and could not be eaten.

TABLE 2

Results

| | Comparative Example 1 | Comparative Example 2 | Comparative Example 3 | Comparative Example 4 | Comparative Example 5 | Example 1 | Example 2 | Example 3 | Example 4 | Example 5 |
|---|---|---|---|---|---|---|---|---|---|---|
| D + 7 | 1 | 1 | 1 | 1 | 2 | 5 | 5 | 5 | 5 | — |
| D + 14 | — | — | — | — | 1 | 4 | 4 | 4 | 4 | 4 |
| D + 21 | — | — | — | — | — | 3 | 3 | 3 | 4 | 3 |
| D + 28 | — | — | — | — | — | 1 | 2 | 2 | — | 3 |
| D + 42 | — | — | — | — | — | — | — | — | — | 3 |
| D + 56 | — | — | — | — | — | — | — | — | — | 2 |

| | Example 6 | Example 7 | Example 8 | Example 9 | Example 10 | Example 11 | Example 12 | Example 13 | Example 14 |
|---|---|---|---|---|---|---|---|---|---|
| D + 7 | — | — | — | — | — | — | — | — | — |
| D + 14 | 5 | 5 | — | — | — | — | — | — | — |
| D + 21 | 4 | 4 | 3 | 3 | 4 | 4 | 4 | 4 | 4 |
| D + 28 | 3 | 4 | 3 | 3 | 3 | 3 | 4 | 4 | 4 |
| D + 42 | 3 | — | 2 | 2 | 2 | 3 | 3 | 3 | 3 |
| D + 56 | 2 | — | — | — | — | — | — | — | — |

D + indicates the number of days since production

CONCLUSIONS

As shown in Table 2, when a pH is adjusted to a predetermined value, in a chocolate-like food containing highly unsaturated fatty acids, it is possible to reduce change in flavor over time.

The invention claimed is:

1. A chocolate-like food comprising a highly unsaturated fatty acid-containing oil and fat composition, wherein the chocolate-like food has a total of 0.02 to 5 weight % of EPA and DHA, a pH of the chocolate-like food is adjusted to 5.8 to 8, and
the highly unsaturated fatty acid-containing oil and fat composition comprises 1 to 10 weight % of an aqueous phase containing a total of 3 to 65 weight % of a water-soluble antioxidant dispersed in a particle size of 300 nm or less in an oil phase.

2. The chocolate-like food according to claim 1,
wherein the highly unsaturated fatty acid-containing oil and fat composition comprises an antioxidant oil and fat composition in which 1 to 10 weight % of the aqueous phase containing a total of 3 to 65 weight % of the water-soluble antioxidant is dispersed in a particle size of 300 nm or less in the oil phase in highly unsaturated fatty acid-containing oils and fats.

3. The chocolate-like food according to claim 1,
wherein at least one oil-soluble emulsifier selected from polyglycerol esters, sugar esters, sorbitan esters, monoglycerin fatty acid esters, and lecithin is contained in the oil phase.

4. The chocolate-like food according to claim 2,
wherein at least one oil-soluble emulsifier selected from polyglycerol esters, sugar esters, sorbitan esters, monoglycerin fatty acid esters, and lecithin is contained in the oil phase.

5. A method of producing a chocolate-like food comprising:
mixing raw chocolate materials, adjusting the pH in the range from 5.8 to 8;
dispersing 1 to 10 weight % of an aqueous phase containing a total of 3 to 65 weight % of a water-soluble antioxidant in an oil phase in a particle size of 300 nm or less to obtain a highly unsaturated fatty acid-containing oil and fat composition;
micronizing and refining the raw chocolate materials; and
adding the highly unsaturated fatty acid-containing oil and fat composition to the raw chocolate materials at the final step of the refining process, such that the chocolate-like food has a total of 0.02 to 5 weight % of EPA and DHA and the pH adjusted in the range from 5.8 to 8.

6. The method of producing a chocolate-like food according to claim 5,
wherein the pH is adjusted using alkali treated-cocoa and/or cacao mass.

7. The method of producing a chocolate-like food according to claim 5,
wherein an antioxidant oil and fat composition in which 1 to 10 weight % of the aqueous phase containing a total of 3 to 65 weight % of the water-soluble antioxidant is dispersed in the particle size of 300 nm or less in the oil phase in highly unsaturated fatty acid-containing oils and fats to obtain the highly unsaturated fatty acid-containing oil and fat composition having a total of 0.02 to 5 weight % of EPA and DHA, and the pH is adjusted to 5.8 to 8.

8. The method of producing a chocolate-like food according to claim 6,
wherein an antioxidant oil and fat composition in which 1 to 10 weight % of the aqueous phase containing a total of 3 to 65 weight % of the water-soluble antioxidant is dispersed in the particle size of 300 nm or less in the oil phase in highly unsaturated fatty acid-containing oils and fats to obtain the highly unsaturated fatty acid-containing oil and fat composition having a total of 0.02 to 5 weight % of EPA and DHA, and the pH is adjusted to 5.8 to 8.

9. The method of producing a chocolate-like food according to claim 5,
wherein at least one oil-soluble emulsifier selected from polyglycerol esters, sugar esters, sorbitan esters, monoglycerin fatty acid esters, and lecithin is contained in the oil phase.

10. The method of producing a chocolate-like food according to claim 6,
wherein at least one oil-soluble emulsifier selected from polyglycerol esters, sugar esters, sorbitan esters, monoglycerin fatty acid esters, and lecithin is contained in the oil phase.

11. The method of producing a chocolate-like food according to claim 7,
wherein at least one oil-soluble emulsifier selected from polyglycerol esters, sugar esters, sorbitan esters, monoglycerin fatty acid esters, and lecithin is contained in the oil phase.

12. The method of producing a chocolate-like food according to claim 8,
wherein at least one oil-soluble emulsifier selected from polyglycerol esters, sugar esters, sorbitan esters, monoglycerin fatty acid esters, and lecithin is contained in the oil phase.

13. A method of reducing off-flavors in a chocolate-like food, comprising:
mixing raw chocolate materials, adjusting the pH in the range from 5.8 to 8;
preparing a highly unsaturated fatty acid-containing oil and fat composition in which 1 to 10 weight % of an aqueous phase containing a total of 3 to 65 weight % of a water-soluble antioxidant is dispersed in an oil phase in a particle size of 300 nm or less;
micronizing and refining the raw chocolate materials; and
adding the highly unsaturated fatty acid-containing oil and fat composition to the raw chocolate materials at the final step of the refining process, so that the chocolate-like food has a total of 0.02 to 5 weight % of EPA and DHA and the pH adjusted in the range from 5.8 to 8.

* * * * *